United States Patent
Lee et al.

(10) Patent No.: US 9,900,901 B1
(45) Date of Patent: Feb. 20, 2018

(54) SOUNDING METHOD AND WIRELESS COMMUNICATION SYSTEM

(71) Applicant: MEDIATEK INC., Hsin-Chu (TW)

(72) Inventors: Yu-Ju Lee, Miaoli (TW); Ying-You Lin, Taoyuan (TW); Chih-Kun Chang, New Taipei (TW); Chih-Wei Kang, Taipei (TW); Hsi-Chang Yang, Hshinchu County (TW)

(73) Assignee: MEDIATEK INC., Hsin-Chu (TW)

( * ) Notice: Subject to any disclaimer, the term of this patent is extended or adjusted under 35 U.S.C. 154(b) by 52 days.

(21) Appl. No.: 14/975,842

(22) Filed: Dec. 20, 2015

Related U.S. Application Data

(60) Provisional application No. 62/150,853, filed on Apr. 22, 2015.

(51) Int. Cl.
  *H04W 72/12* (2009.01)
  *H04L 25/02* (2006.01)

(52) U.S. Cl.
  CPC ..... *H04W 72/1231* (2013.01); *H04L 25/0224* (2013.01)

(58) Field of Classification Search
  CPC ................................................. H04W 72/1231
  See application file for complete search history.

(56) References Cited

U.S. PATENT DOCUMENTS

| | | | | |
|---|---|---|---|---|
| 8,270,909 B2* | 9/2012 | Zhang | | H04B 7/0413 370/334 |
| 8,824,386 B2* | 9/2014 | Pare, Jr. | | H04B 7/0452 370/329 |
| 9,247,382 B2* | 1/2016 | Guo | | G01S 5/02 |
| 2008/0267165 A1* | 10/2008 | Bertrand | | H04J 3/06 370/350 |
| 2009/0316811 A1* | 12/2009 | Maeda | | H04L 1/1671 375/260 |
| 2010/0135273 A1* | 6/2010 | Kim | | H04B 1/69 370/344 |
| 2011/0188599 A1* | 8/2011 | Kang | | H04B 7/02 375/267 |
| 2011/0268028 A1* | 11/2011 | Stern-Berkowitz | | H04L 5/0048 370/328 |
| 2011/0310818 A1* | 12/2011 | Lin | | H04W 72/042 370/329 |
| 2012/0014349 A1* | 1/2012 | Chung | | H04B 7/0684 370/329 |
| 2012/0063348 A1* | 3/2012 | Guo | | H04B 7/0617 370/252 |
| 2012/0076040 A1* | 3/2012 | Hoshino | | H04W 24/10 370/252 |

(Continued)

*Primary Examiner* — Parth Patel

(74) *Attorney, Agent, or Firm* — Winston Hsu

(57) ABSTRACT

A sounding method utilized for a wireless communication system is disclosed. The wireless communication system comprises a base station and a plurality of stations, and the plurality of stations are divided into a plurality of groups. The sounding method comprising receiving a first sounding request from a first group of the plurality of groups; determining whether the first sounding request is granted for performing sounding after receiving the first sounding request; determining an initial sounding instant for the first group when the first sounding request is granted; and performing sounding of the first group starting at the initial sounding instant when the first sounding request is granted.

10 Claims, 4 Drawing Sheets

(56) References Cited

U.S. PATENT DOCUMENTS

| | | | | |
|---|---|---|---|---|
| 2012/0147774 A1* | 6/2012 | Park | ............... | H04L 5/0035 370/252 |
| 2012/0182857 A1* | 7/2012 | Bertrand | ............ | H04J 13/0062 370/210 |
| 2012/0275391 A1* | 11/2012 | Cui | ............... | H04W 72/1247 370/329 |
| 2012/0275411 A1* | 11/2012 | Kim | ............... | H04L 5/0032 370/329 |
| 2012/0327855 A1* | 12/2012 | Lee | ............... | H04B 7/155 370/328 |
| 2013/0012186 A1* | 1/2013 | Kim | ............... | H04L 5/003 455/418 |
| 2013/0107849 A1* | 5/2013 | Park | ............... | H04B 7/0417 370/329 |
| 2014/0029569 A1* | 1/2014 | Ni | ............... | H04W 24/02 370/330 |
| 2014/0056204 A1* | 2/2014 | Suh | ............... | H04W 72/1226 370/312 |
| 2014/0098724 A1* | 4/2014 | Park | ............... | H04W 72/02 370/311 |
| 2014/0185483 A1* | 7/2014 | Kim | ............... | H04W 24/02 370/252 |
| 2014/0321406 A1* | 10/2014 | Marinier | ............... | H04B 7/024 370/329 |
| 2015/0011236 A1* | 1/2015 | Kazmi | ............... | H04W 52/365 455/456.1 |
| 2016/0204921 A1* | 7/2016 | Kim | ............... | H04L 12/189 370/312 |
| 2016/0295575 A1* | 10/2016 | Dinan | ............... | H04L 5/0048 |

\* cited by examiner

SOUNDING METHOD AND WIRELESS COMMUNICATION SYSTEM

CROSS REFERENCE TO RELATED APPLICATIONS

This application claims the benefit of U.S. provisional application No. 62/150,853, filed on Apr. 22, 2015 and incorporated herein by reference.

BACKGROUND

The present invention relates to, and more particularly, to capable of performing sounding when there is data to be transmitted.

As a demand for wireless service increases, a very high throughput (VHT) wireless communication system is required for providing more wireless service and faster data transmission rate in the future. In a VHT system, such as IEEE 802.11ac (also known as 5G Wi-Fi), a multi-user multiple input multiple output (MU-MIMO)/beamforming technology is adopted to enhance a system transmission rate of the VHT system. The MU-MIMO/beamforming technology is able to provide multiple data streams to multiple stations (or users) at the same time. Specifically, the MU-MIMO/beamforming technology allows a base station equipped with multiple antennas to form multiple spatial beams toward multiple stations to provide the multiple data streams to the multiple stations, respectively, such that the system performance, e.g., transmission rate, of the VHT system is enhanced.

Performance of the MU-MIMO/beamforming technology relies on accurate channel state information (CSI) obtained at the base station. The base station needs to perform sounding with the stations, which is a procedure involving the stations sending their CSI back to the base state, before performing data transmission via beamforming. For example, please refer to FIG. 1, which is a schematic diagram of a sounding procedure 10 with respect to time t in the prior art. As shown in FIG. 1, a base station broadcasts a null data packet (NDP) announcement and an NDP to all stations to initial the sounding procedure. Then, the base station would designate one station at a time, by sending a beamforming report poll or the NDP announcement, and the designated station would send back the CSI through a compressed beamforming packet to the base station. After the base station receives the CSIs from all the stations, the base station produces a steering pre-coder matrix to steer the multiple spatial beams to multiple stations and performs data transmission. In other words, each user needs to wait until all stations finish sending their CSIs to the base station, and then receives data transmitted from the base station. A length of a sounding overhead, which is a time period from the base station sending the NDP announcement to the base station starting to transmit data, is so long that system performances, such as throughput, delay jitter, quality of service (QoS) requirement, etc., are degraded. In addition, at the time that the base station performs beamforming to transmit data to the stations, the CSIs sent from the stations may already be outdated, such that errors of the transmitted data packets might occur.

Therefore, the prior art needs to be improved.

SUMMARY

It is therefore a primary objective of the present invention to provide a sounding method and a wireless communication system, to improve over disadvantages of the prior art.

An example of the present invention discloses a sounding method, utilized for a wireless communication system. The wireless communication system comprises a base station and a plurality of stations, and the plurality of stations are divided into a plurality of groups. The sounding method comprising receiving by the base station a first sounding request from a first group of the plurality of groups; determining whether the first sounding request is granted for performing sounding after receiving the first sounding request; determining an initial sounding instant for the first group when the first sounding request is granted; and performing sounding of the first group starting at the initial sounding instant when the first sounding request is granted.

An example of the present invention discloses a wireless system. The wireless system comprises a plurality of stations, divided into a plurality of groups; a base station, comprising a processing unit and a storage unit, the storage unit configured to store a program code, the program code instructing the processing unit to perform following steps: receiving a first sounding request from a first group of the plurality of groups; determining whether the first sounding request is granted for performing sounding after receiving the first sounding request; and determining an initial sounding instant for the first group when the first sounding request is granted; wherein the wireless system performs sounding of the first group at the initial sounding instant when the first sounding request is granted.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
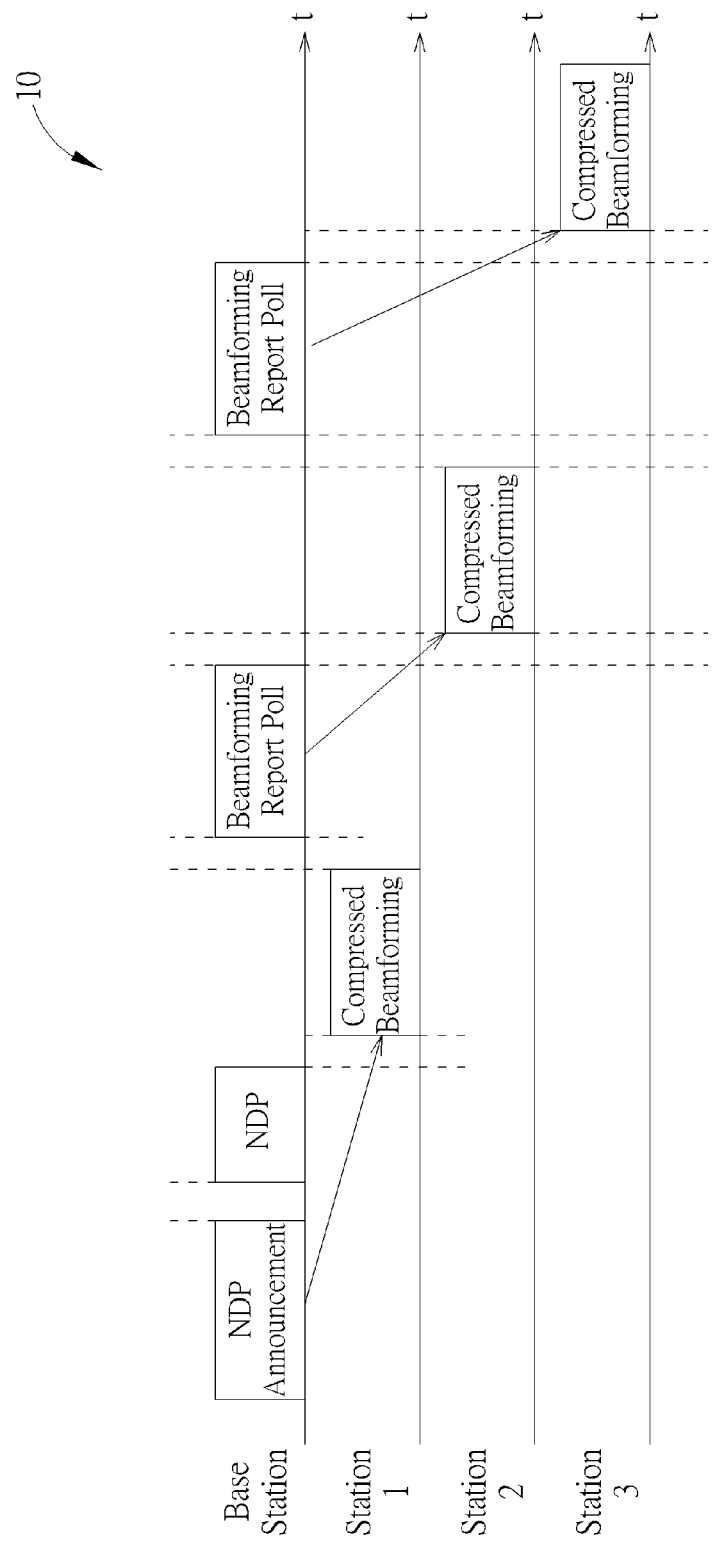
FIG. 1 is a schematic diagram of a sounding procedure in the prior art.
Figure 2:
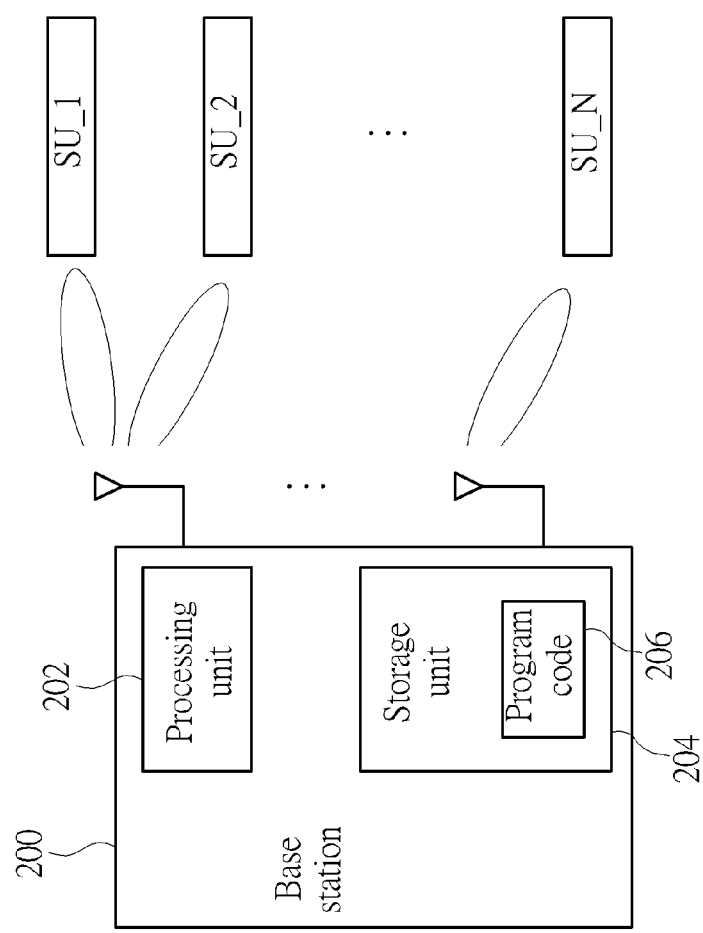
FIG. 2 is a schematic diagram of a wireless communication system according to an embodiment of the present invention.

Please refer to FIG. 2, which is a schematic diagram of a wireless communication system 20 according to an embodiment of the present invention. The wireless communication system 20 may be a wireless local area network (WLAN) system. The wireless communication system 20 may be a WLAN system based on IEEE 802.11 standard. The wireless communication system 20 comprises a base station 200 and stations SU_1-SU_N. The base station 200 may be an access point (AP) in the WLAN system or a station operating in an AP mode, equipped with multiple antennas. The base station 200 comprises a process unit 202 and a storage unit 204. The storage unit SU is utilized for storing a program code 206 to instruct the process unit PU to perform sounding with the stations SU_1-SU_N. The stations SU_1-SU_N may be electronic devices such as computers, notebooks, tablets, smart phones, smart watches, etc., which are wireless users served by the base station 200. The base station needs to perform sounding with the stations SU_1-SU_N, by broadcasting a null data packet announcement and a NDP to the stations SU_1-SU_N and the stations SU_1-SU_N sending their corresponding channel state information (CSI) back to the base station 200, before the base station 200 data transmission via beamforming toward the stations SU_1-SU_N.

The CSIs of the stations SU_1-SUN have different characteristics. For example, some stations of the stations SU_1-SU_N may have high mobility and the CSIs of the high mobility stations may vary fast. At the time that the base station 200 performs beamforming to transmit data to the high mobility stations, the CSIs sent from the high mobility stations may already be outdated, such that errors of the transmitted data might occur. In such a situation, sounding of the high mobility stations may be performed more frequently (with high sounding frequency). On the other hand, some stations of the stations SU_1-SU_N may have low mobility, which means that the CSIs of the low mobility stations are static and sounding of the low mobility stations may be performed less frequently (with low sounding frequency).

Therefore, the stations SU_1-SU_N are divided into groups GP_1-GP_P according to the link conditions of the stations SU_1-SU_N, wherein the link conditions may be one or more indices of transmission rate, packet error rate (PER), and mobility of the stations SU_1-SU_N, and not limited herein. Each of the groups GP_1-GP_P may consist of one or more stations among the stations SU_1-SU_N.

To prevent the CSI from being outdated at the time that the base station 200 performs beamforming to transmit data to the groups GP_1-GP_P, a group GP_x of the groups GP_1-GP_P may propose a sounding request to the base station 200 when the group GP_x has a need of receiving data packets from the base station 200. The base station 200 may determine whether the request proposed by the group GP_x is granted or not. When the request of the group GP_x is granted, the base station 200 may arrange/schedule a sounding time interval, which is a certain period of time, for the group GP_x to perform sounding. Therefore, sounding of the group GP_x is performed right before the data packets are transmitted to the group GP_x, so as to make sure that the CSI received from the group GP_x by the base station 200 is the latest CSI at the time the base station 200 transmits data to the group GP_x, and prevent the CSI of the group GP_x from being outdated, such that an error rate of the data packets is reduced.

Figure 3:
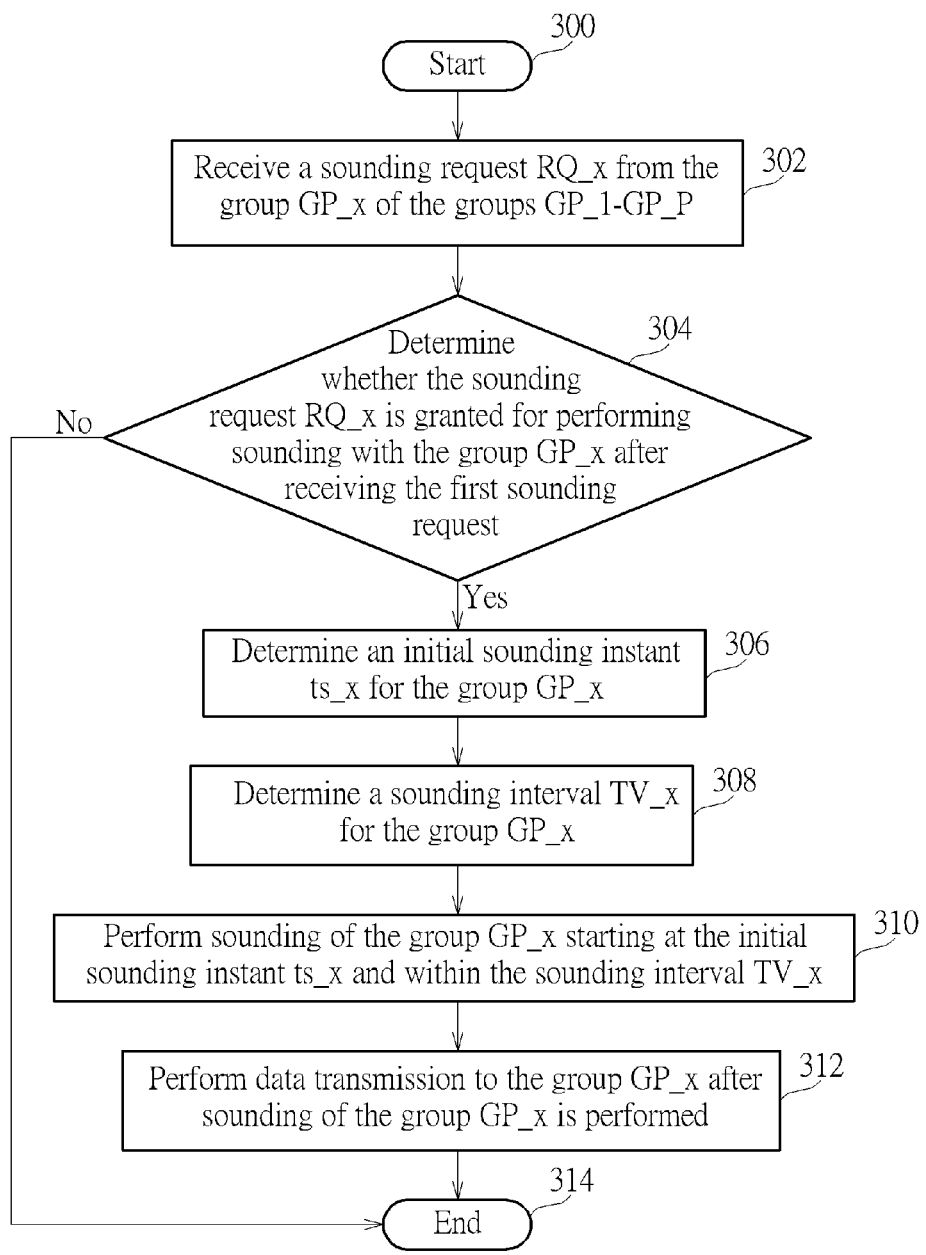
FIG. 3 is a schematic diagram of a sounding process according to an embodiment of the present invention.

Operational principles of the base station 200 receiving sounding requests from the groups GP_1-GP_P, arranging sounding time intervals for the groups GP_1-GP_P, and performing sounding described in the above may be summarized into a sounding process 30, as shown in FIG. 3. The sounding process 30 may be compiled as the program code 206 stored in the storage unit 204 and executed by the process unit 202. The sounding process 30 comprises following steps:

Step 300: Start.
Step 302: Receive a sounding request RQ_x from the group GP_x of the groups GP_1-GP_P.
Step 304: Determine whether the sounding request RQ_x is granted for performing sounding with the group GP_x after receiving the first sounding request. If yes, go to Step 306, otherwise, go to Step 314.
Step 306: Determine an initial sounding instant ts_x for the group GP_x.
Step 308: Determine a sounding interval TV_x for the group GP_x.
Step 310: Perform sounding of the group GP_x starting at the initial sounding instant ts_x and within the sounding interval TV_x.
Step 312: Perform data transmission to the group GP_x after sounding of the group GP_x is performed.
Step 314: End.

According to the sounding process 30, the base station 200 receives the sounding request RQ_x from the group GP_x, arranging the sounding time interval for the group GP_x, performs sounding with the group GP_x, and performs data transmission to the group GP_x. In other words, the sounding process 30 of the present invention is a sounding-on-demand process, meaning that sounding is performed when there is data to be transmitted. Otherwise, when the group GP_x do not have data to be transmitted, the group GP_x spares a chance of performing sounding and yields the chance to other groups of the groups GP_1-GP_P to perform sounding, such that an overhead of the groups GP_1-GP_P is reduced and a system throughput of the groups GP_1-GP_P is enhanced.

Specifically, in Step 302 and Step 304, the base station 200 receives the sounding request RQ_x from the group GP_x of the groups GP_1-GP_P. The group GP_x may propose the sounding request RQ_x when the group GP_x has data traffic queuing in a data buffer of the base station 200, which is needed to be transmitted by the base station 200 to the group GP_x. Moreover, the group GP_x may propose the sounding request RQ_x when the data traffic queuing in the data buffer of the base station 200 has timeliness, i.e., data packets of the data traffic are needed to be transmitted by the base station 200 to the group GP_x in a short time. After the base station 200 receives the sounding request RQ_x from the group GP_x, the base station 200 would determine whether the sounding request RQ_x is granted, for performing sounding with the group GP_x. Determining whether the sounding request RQ_x is granted or not may be performed according to factors such as fairness of performing sounding with the groups GP_1-GP_P, system throughput enhancement contributed by the group GP_x, priority of preference of allocating wireless resource among the groups GP_1-GP_P, etc., and not limited herein.

Once the base station 200 determines that the sounding request RQ_x is granted, in Step 306 to Step 310, the base station 200 determines the initial sounding instant ts_x and the sounding interval TV_x for the group GP_x to perform sounding with the group GP_x starting at the initial sounding instant ts_x within the sounding interval TV_x. The initial sounding instant ts_x may be determined according to quality of service (QoS) requirements, e.g., timeliness, urgency, of data traffic of the group GP_x queuing in the base station 200, and not limited herein. The sounding interval TV_x may be determined according to a transmission rate or PER of the group GP_x, and not limited herein. For example, the sounding interval TV_x may be determined as $$TV\_x = T_0 * \min(2^K, 2^{10}) * 2^{-\min\left(0, \left(\frac{l(r)}{l_0}\right)\right)},$$

wherein $T_0$ represents an initial sounding interval, K represents a sounding times at a transmission rate r, l(r) represents a sub-frame packet error rate (SPER) at the transmission rate r, and $l_0$ represents a threshold of the transmission rate r.

Furthermore, when the base station 200 receives sounding requests from more than one group of the groups GP_1-GP_P within in a short time and grants the sounding requests, the initial sounding instants and the sounding intervals of the groups proposing the sounding requests are determined such that the sounding interval of the groups proposing the sounding requests are interleaved. In other words, the base station 200 performs sounding with one group of the groups GP_1-GP_P at a time. Furthermore, an ordering of the groups proposing the sounding requests may also be determined according to QoS requirements of the data traffic of the groups proposing the sounding requests, and not limited herein.

After the base station 200 performs sounding with the group GP_x starting at the initial sounding instant ts_x within the sounding interval TV_x, in Step 312, the base station 200 performs data transmission to the group GP_x. Specifically, after the base station 200 performs sounding with the group GP_x, the base station 200 obtains the latest CSI of the group GP_x. The base station 200 may form beams toward stations within the group GP_x to transmit data packets to the stations within the group GP_x. The CSI from the group GP_x is the latest at the time the base station forms beams, so as to reduce the error rate of the transmitted data packet to the group GP_x.

Figure 4:
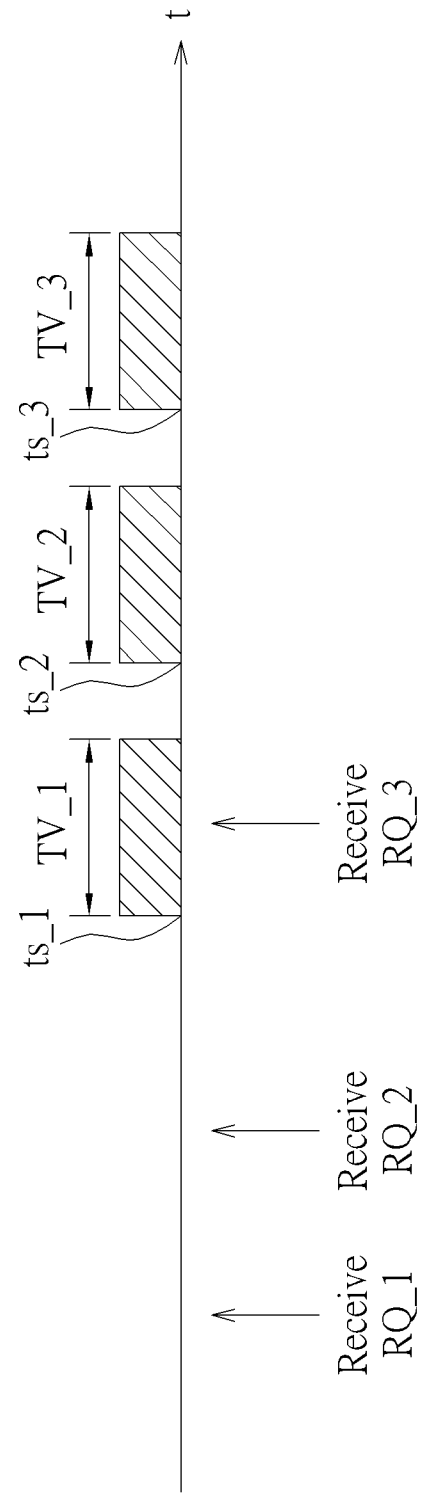
FIG. 4 is a schematic diagram of a sounding procedure according to an example of the present invention

Notably, receiving sounding requests of the group GP_x and transmitting data packets to a group GP_y may be performed by the base station 200 at the same time. For example, please refer to FIG. 4, which is a schematic diagram of a sounding procedure 40 with respect to time t according to an example of the present invention. As shown in FIG. 4, the base station performs sounding with the groups GP_1-GP_3 starting at the initial sounding instants ts_1-ts_3 within the sounding intervals TV_1-TV_3, respectively. Notably, during the sounding interval TV_1, the base station may receive a sounding request RQ_3 proposed by the group GP_3 in the meantime. In short, receiving sounding requests from one group of the groups GP_1-GP_P would not affect performing transmitting data packets to another group of the groups GP_1-GP_P.

In the prior art, the CSIs sent from the stations may already be outdated at the time that the base station performs beamforming, resulting in errors of the transmitted packets. In comparison, the present invention performs sounding when there is data to be transmitted. At the time that the base station forms beams to transmit data, the CSI received by the base station is latest, so as to reduce an error rate of the transmitted data packet.

Notably, the examples described in the above are for illustrating purpose. Those skilled in the art may make modifications and alternations accordingly, and not limited herein. For example, the groups GP_1-GP_P may decide whether to propose sounding request according to indicators such as PER, current modulation and coding scheme (MCS), threshold of adjusting the MCS, mobility of the stations, variation of system throughput, variation of transmission rate, channel bandwidth, QoS requirements, etc., and not limited herein. In addition, the process unit 202 may be implemented by a central processing unit (CPU), a microprocessor, or via application-specific integrated circuit (ASIC), which is not limited herein. The storage unit 204 may be read-only memory (ROM), random-access memory (RAM), CD-ROMs, magnetic tapes, floppy disks, optical data storage devices, etc., and not limited herein.

In summary, the sounding process of the present invention is a sounding-on-demand process, which performs sounding when there is data to be transmitted. At the time that the base station forms beams to transmit data, the CSI received by the base station is latest, such that the error rate of data packet transmitted is reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A sounding method, utilized for a wireless communication system, the wireless communication system comprising a base station and a plurality of stations, the plurality of stations are divided into a plurality of groups according to link conditions of the stations, the method comprising:
   receiving a first sounding request by the base station from a first group of the plurality of groups;
   determining by the base station whether the first sounding request is granted for performing sounding after receiving the first sounding request;
   determining by the base station an initial sounding instant for the first group when the first sounding request is granted; and
   performing by the base station sounding of the first group starting at the initial sounding instant when the first sounding request is granted.

2. The sounding method of claim 1, further comprising:
   performing data transmission to the first group after sounding of the first group is performed when the first sounding request is granted.

3. The sounding method of claim 1, further comprising:
   determining a sounding interval for the first group when the first sounding request is granted; and
   performing sounding of the first group starting at the initial sounding instant and within the sounding interval when the first sounding request is granted.

4. The sounding method of claim 1, wherein the first group sends the first sounding request when a second group of the plurality of groups performs sounding.

5. The sounding method of claim 1, wherein each of the plurality of groups comprises at least a station of the plurality of stations.

6. A wireless system, comprising:
   a plurality of stations, divided into a plurality of groups according to link conditions of the stations;
   a base station, comprising a processing unit and a storage unit, the storage unit configured to store a program code, the program code instructing the processing unit to perform following steps:
      receiving a first sounding request from a first group of the plurality of groups;
      determining whether the first sounding request is granted for performing sounding after receiving the first sounding request; and
      determining an initial sounding instant for the first group when the first sounding request is granted;
   wherein the wireless system performs sounding of the first group at the initial sounding instant when the first sounding request is granted.

7. The wireless system of claim 6, wherein the program code further instructs the processing unit to perform the following step:
   performing data transmission to the first group after sounding of the first group is performed when the first sounding request is granted.

8. The wireless system of claim 6, wherein the program code further instructs the processing unit to perform the following step:
   determining a sounding interval for the first group when the first sounding request is granted; and performing sounding of the first group starting at the initial sounding instant and within the sounding interval when the first sounding request is granted.

9. The wireless system of claim 6, wherein the first group sends the first sounding request when a second group of the plurality of groups performs sounding.

10. The wireless system of claim 6, wherein each of the plurality of groups comprises at least a station of the plurality of stations.

\* \* \* \* \*